(12) United States Patent
Yamaji

(10) Patent No.: US 9,721,163 B2
(45) Date of Patent: Aug. 1, 2017

(54) IMAGE PROCESSING APPARATUS, IMAGE PROCESSING METHOD, AND RECORDING MEDIUM

(71) Applicant: FUJIFILM Corporation, Tokyo (JP)

(72) Inventor: Kei Yamaji, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 22 days.

(21) Appl. No.: 14/829,960

(22) Filed: Aug. 19, 2015

(65) Prior Publication Data

US 2016/0070953 A1   Mar. 10, 2016

(30) Foreign Application Priority Data

Sep. 10, 2014 (JP) .................................. 2014-184320

(51) Int. Cl.
 *G06K 9/00* (2006.01)
 *G09G 5/00* (2006.01)

(52) U.S. Cl.
 CPC ............................... *G06K 9/00684* (2013.01)

(58) Field of Classification Search
 CPC ........... G06K 9/00684; G06K 9/00228; G06K 9/00221; G06K 9/00288; G06K 9/00281; G06K 9/00248
 USPC ....... 382/100, 128, 132, 266, 181, 190, 195, 382/199, 137, 133, 254, 118; 345/418, 345/619, 629
 See application file for complete search history.

(56) References Cited

U.S. PATENT DOCUMENTS

| | | | | |
|---|---|---|---|---|
| 7,933,452 B2* | 4/2011 | Marques | ........... | G06F 17/30256 348/125 |
| 8,223,143 B2* | 7/2012 | Dastmalchi | ............ | A61B 3/102 345/418 |
| 8,396,264 B2 | 3/2013 | Moriyama et al. | | |
| 8,732,149 B2 | 5/2014 | Iida et al. | | |
| 8,929,669 B2* | 1/2015 | Yabu | ................ | G06F 17/30247 382/225 |

(Continued)

FOREIGN PATENT DOCUMENTS

| | | |
|---|---|---|
| JP | 2004-236120 | 8/2004 |
| JP | 2006-020065 | 1/2006 |

(Continued)

OTHER PUBLICATIONS

Japanese Official Action—JP2014-184320—Sep. 13, 2016.

*Primary Examiner* — Sheela C Chawan
(74) *Attorney, Agent, or Firm* — Young & Thompson

(57) ABSTRACT

In an image processing apparatus, a degree-of-relevance calculation unit calculates a degree of relevance between each of a plurality of images on the basis of a person's face, determination results of scenes and objects, GPS information, and a degree of similarity. An important image extraction unit extracts images captured over a certain period of time including a reference date for determining a degree of importance of the image, and images captured over a certain period of time including a relevant date relevant to the reference date, as important image, from the plurality of images. A relevant image extraction unit extracts a certain number of images as relevant images from important images in which the degree of relevance for a selected image selected from the plurality of images by an instruction which is input through an instruction input unit is equal to or greater than a threshold.

23 Claims, 7 Drawing Sheets

(56) References Cited

U.S. PATENT DOCUMENTS

| | | | |
|---|---|---|---|
| 8,971,591 B2 * | 3/2015 | Kovtun | G06K 9/00288 382/115 |
| 8,989,504 B2 * | 3/2015 | Suzuki | H04N 1/00336 382/118 |
| 9,324,379 B2 * | 4/2016 | Lee | G11B 27/28 |
| 2004/0258304 A1 | 12/2004 | Shiota et al. | |
| 2010/0287502 A1 | 11/2010 | Ito et al. | |
| 2011/0304779 A1 | 12/2011 | Wada et al. | |
| 2013/0243273 A1 * | 9/2013 | Yamaji | G06K 9/00228 382/118 |
| 2014/0270370 A1 * | 9/2014 | Saito | G06K 9/00288 382/103 |

FOREIGN PATENT DOCUMENTS

| | | |
|---|---|---|
| JP | 2007-226536 | 9/2007 |
| JP | 2010-074297 | 4/2010 |
| JP | 2010-218059 | 9/2010 |
| JP | 2010-287220 | 12/2010 |
| JP | 2012-003427 | 1/2012 |
| JP | 2012-053776 | 3/2012 |
| WO | 2011/152072 | 12/2011 |

* cited by examiner

FIG. 4
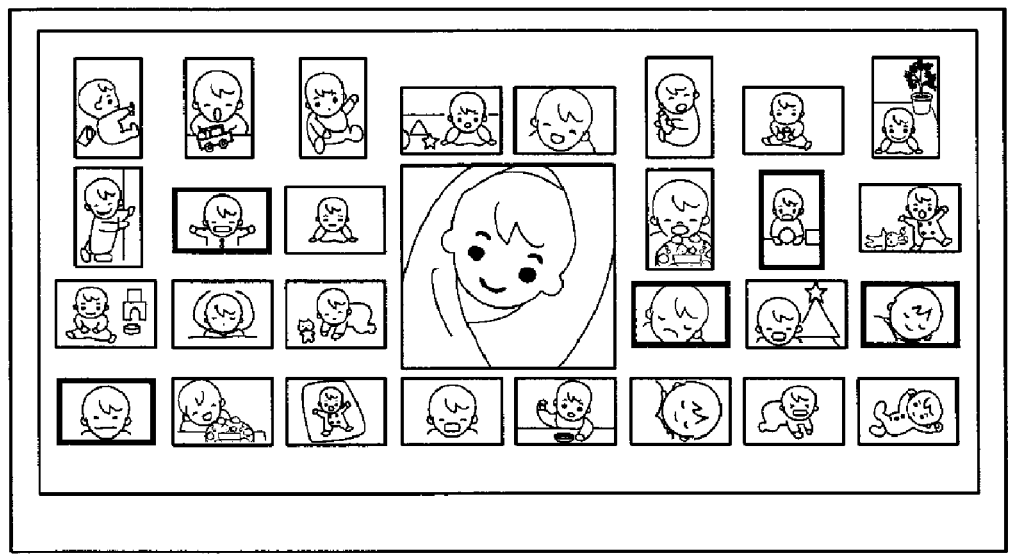
FIG. 5
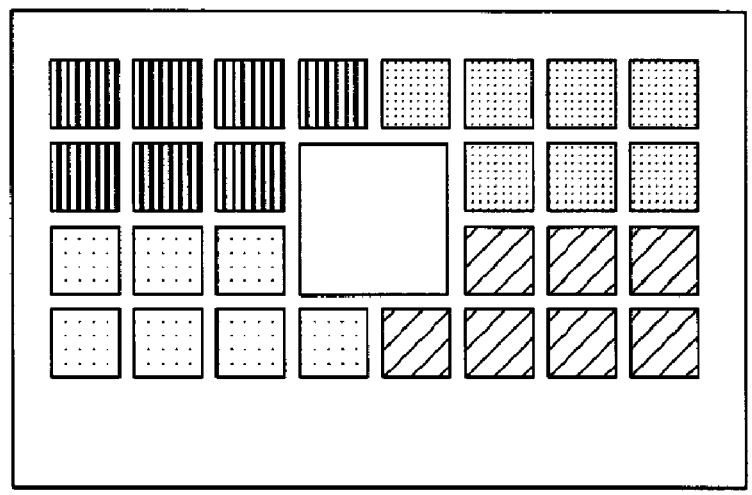
 FACE  SCENE
 SHOOTING DATE  COLOR TONE

IMAGE PROCESSING APPARATUS, IMAGE PROCESSING METHOD, AND RECORDING MEDIUM

CROSS-REFERENCE TO RELATED APPLICATIONS

The present application claims priority under 35 U.S.C. §119 to Japanese Patent Application No. 2014-184320, filed on Sep. 10, 2014. Each of the above application(s) is hereby expressly incorporated by reference, in its entirety, into the present application.

BACKGROUND OF THE INVENTION

1. Field of the Invention

The present invention relates to an image processing apparatus, an image processing method, and a recording medium which are capable of extracting a certain number of relevant images relevant to a selected image selected by a user from a plurality of images.

2. Description of the Related Art

When a large number of images are stored in a recording medium such as a user's hard disk, images are searched for on the basis of, for example, a photographing date or the like, and thus a certain number of images can be sequentially displayed as a list from images on a corresponding photographing date.

However, hundreds of images may be stored on a certain photographing date, and thus when a certain number of images are sequentially displayed as a list, it is fairly troublesome to search for images on an initial page, the next page, and the like falling within a certain day, a certain month, and a certain year. For this reason, a large number of images are stored on a recording medium as they are, and thus even a user himself (or herself) may often forget what images are stored thereon.

Here, related art documents relevant to the present invention include JP2006-20065A and JP2004-236120A.

JP2006-20065A relates to a portable electronic photograph album. The above document discloses that, for example, images of which pieces of photographing location information are approximately coincident with each other are displayed on each of first and second display devices, on the basis of photographing location information or photographing date information, and that the images contrast with each other. In addition, the above document discloses that images in which some of photographing date and time information are the same as each other (for example, the days and months are the same as each other, and the years are different from each other) are displayed on each of the first and second display devices.

JP2004-236120A relates to a sorting device or the like that sorts a plurality of photographic images acquired by image capture. The above document discloses that the photographic images are classified into a plurality of groups on the basis of a difference in a photographing place, a photographing time, a scene, and the like. In addition, the above document discloses that acceptable photographic images are extracted from each group on the basis of sorting conditions, such as defocusing, eyes being closed, and a camera shake, in which the same person is photographed.

SUMMARY OF THE INVENTION

The present invention has been made to provide an image processing apparatus, an image processing method, and a recording medium which are capable of automatically extracting a certain number of images from a large number of images, and allowing a user to enjoy viewing the images from various viewpoints.

In order to achieve the above object, according to an aspect of the present invention, there is provided an image processing apparatus including: a degree-of-relevance calculation unit configured to calculate a degree of relevance between a plurality of images based upon at least one item selected from a group consisted of a person's face captured in the images, determination results of scenes and objects in the images, GPS information of the images, and a degree of similarity of the images; an important image extraction unit configured to extract images captured over a certain period of time including a reference date for determining a degree of importance of the image, and images captured over a certain period of time including a relevant date relevant to the reference date, as important images, from the plurality of images; an instruction input unit configured to receive various instructions input by a user; and a relevant image extraction unit configured to extract a certain number of images, as relevant images, from the important images of which the degree of relevance to a selected image selected from the plurality of images by the instruction input through the instruction input unit is equal to or greater than a threshold.

In a case where the degree of relevance is calculated on the basis of the person's face captured in the images, the degree-of-relevance calculation unit may calculate the degree of relevance based upon at least one selected from a group consisted of individual persons determined by a central person determination for a plurality of persons captured in the plurality of images, the number of person's faces captured in the images, and sizes of the person's faces captured in the images.

In addition, in a case where the degree of relevance is calculated on the basis of two or more items selected from the group consisted of the person's face captured in the images, the determination results of scenes and objects in the images, the GPS information of the images, and the degree of similarity of the images, the degree-of-relevance calculation unit may calculate, as the degree of relevance, a comprehensive degree of relevance which is a sum total of products of the items and weighting coefficients for the items, with respect to the two or more items.

In addition, in a case where a photographing period of time over which the plurality of images have been shot is longer than a year, the important image extraction unit may extract, as the important images, images captured over a certain period of time including the same day of the same month as the reference date of one or more other years than the year to which the reference date belong.

In addition, in a case where a photographing period of time over which the plurality of images have been shot is longer than a year, the important image extraction unit may extract, as the important images, images captured in the same season as the reference date of one or more other years than the year to which the reference date belong, as the relevant date.

In addition, in a case where a photographing period of time over which the plurality of images have been shot is within a year, the important image extraction unit may extract, as the important images, images captured over a certain period of time including the same day as the reference date of one or more other months than the month to which the reference date belong, as the relevant date.

In addition, in a case where a photographing period of time over which the plurality of images have been shot is within a year, the important image extraction unit may extract, as the important images, images captured on the same day of the week as the reference date in one or more other weeks than the week to which the reference date belong, as the relevant date.

In addition, the important image extraction unit may determine the degree of importance of the important images so that the degree of importance of the images captured over a certain period of time including the reference date is highest, and that the degree of importance of the images captured over a certain period of time including the relevant date gradually becomes lower as the relevant date becomes farther from the reference date.

In addition, the relevant image extraction unit may extract a certain number images corresponding to a ratio between the degrees of importance of the images captured over a certain period of time including the reference date and the images captured over a certain period of time including the relevant date, from the images captured over a certain period of time including the reference date and the images captured over a certain period of time including the relevant date.

In addition, the relevant image extraction unit may extract images evenly from the important images of which the degree of relevance to the selected image is equal to or greater than a threshold.

The image processing apparatus may further include a display unit configured to display a list of the selected image and the certain number of relevant images.

In addition, in a case where the list of the selected image and the certain number of relevant images is initially displayed after a startup of the image processing apparatus, the reference date may be a date on which the image processing apparatus is started up.

In addition, in a case where an instruction for selecting one relevant image from the certain number of relevant images in the displayed list is input through the instruction input unit, the important image extraction unit may extract the important images, using a photographing date of the one relevant image which is selected as the reference date, the relevant image extraction unit may extract the certain number of relevant images, using the one relevant image which is selected as the selected image, and the display unit may display a list of the one relevant image which is selected and the certain number of relevant images extracted using the one relevant image which is selected as the selected image.

In addition, the image processing apparatus may further include an image identification unit configured to identifiably displays relevant images capable of extracting the certain number of relevant images, in a case where the certain number of relevant images is capable of being extracted from the plurality of images, using the relevant image as the selected image, with respect to the certain number of relevant images in the displayed list.

In addition, the image identification unit may identifiably display relevant images which satisfy least one condition selected among a person's face captured in the relevant images being identifiable, scenes and objects of the relevant images being identifiable, GPS information of the relevant images being present, and an image of which the degree of similarity to the relevant images is equal to or greater than a threshold being included in the plurality of images.

In addition, it is preferable that the image identification unit may display the relevant images satisfying the at least one item so as to be surrounded by a frame.

In addition, the image identification unit may perform a display in a state where a size of the relevant image satisfying the at least one item is made larger than a size of the relevant image which does not satisfy the at least one item.

In addition, the display unit may display the list of the certain number of relevant images by classification into relevant images having the same feature.

The image processing apparatus may further include a display unit configured to display the list of the selected image and the certain number of relevant images, wherein the display unit may display the list of certain number of relevant images in such a manner that the relevant images are arranged side by side in order of the comprehensive degree of relevance.

In addition, the important image extraction unit may change the reference date whenever a certain period of time has elapsed, and extracts the important images based upon the changed reference date.

In addition, the degree-of-relevance calculation unit may calculate the degree of relevance based upon at least one item designated by the instruction which is input through the instruction input unit, among the person's face captured in the images, the determination results of scenes and objects in the images, the GPS information of the images, and the degree of similarity of the images.

In addition, according to another aspect of the present invention, there is provided an image processing method including: a step of causing a degree-of-relevance calculation unit to calculate a degree of relevance between a plurality of images based upon at least one item selected from a group consisted of a person's face captured in the images, determination results of scenes and objects in the images, GPS information of the images, and a degree of similarity of the images; a step of causing an important image extraction unit to extract images captured over a certain period of time including a reference date for determining a degree of importance of the image, and images captured over a certain period of time including a relevant date relevant to the reference date, as important images, from the plurality of images; and a step of causing a relevant image extraction unit to extract a certain number of images, as relevant images, from the important images of which the degree of relevance to a selected image selected from the plurality of images by an instruction which is input through an instruction input unit is equal to or greater than a threshold.

In addition, according to still another aspect of the present invention, there is provided a non-transitory computer readable recording medium on which recorded is a program for causing a computer to execute each step of the aforementioned image processing method.

According to the present invention, a user selects one image as the selected image from the plurality of images, and thus a certain number of relevant images relevant to the selected image are automatically extracted from the plurality of images and are displayed as a list on the display unit. A user views a certain number of relevant images relevant to the selected image which is automatically displayed, and thus can refresh a forgotten memory even for the user himself (or herself) together with surprise or nostalgia.

In addition, a user selects one relevant image as the selected image from a certain number of relevant images, displayed as a list, which are extracted using one relevant image selected, as the selected image, and thus a certain number of relevant images displayed as a list are sequentially changed. A user can change images to be displayed one after another from various viewpoints, and can continue to enjoy viewing a certain number of relevant images relevant to the selected image, or enjoy printing a display screen.

In addition, a user does not select one relevant image as the selected image from a certain number of relevant images displayed as a list, but a certain number of relevant images displayed as a list are automatically sequentially changed whenever a certain period of time has elapsed. A user can continue to enjoy viewing a certain number of relevant images relevant to the selected image which is sequentially changed whenever a certain period of time has elapsed.

BRIEF DESCRIPTION OF THE DRAWINGS

FIG. 4 is a conceptual diagram of an example illustrating a display screen in which a certain number of relevant images are displayed as a list side by side in order of photographing date.

FIG. 5 is a conceptual diagram of an example illustrating a display screen in which a certain number of relevant images are classified into relevant images having the same feature and are displayed as a list.

DESCRIPTION OF THE PREFERRED EMBODIMENTS

Hereinafter, an image processing apparatus, an image processing method, and a recording medium of the present invention will be described in detail on the basis of a preferred embodiment shown in the accompanying drawings.

Figure 1:
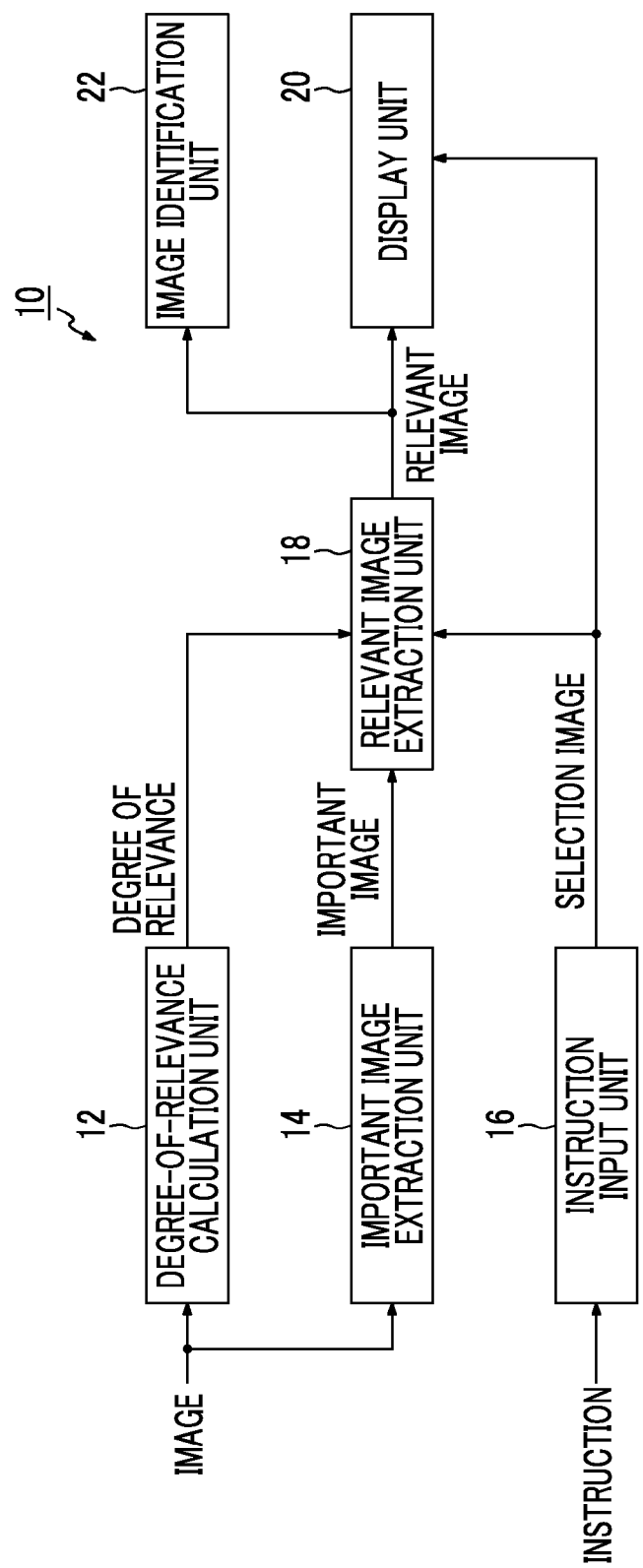
FIG. 1 is a block diagram of an embodiment illustrating a configuration of an image processing apparatus according to an embodiment the present invention.

FIG. 1 is a block diagram of an embodiment illustrating a configuration of an image processing apparatus of the present invention. An image processing apparatus 10 shown in the drawing extracts a certain number of relevant images relevant to a selected image which is selected by a user from a plurality of images. The image processing apparatus 10 includes a degree-of-relevance calculation unit 12, an important image extraction unit 14, an instruction input unit 16, a relevant image extraction unit 18, a display unit 20, and an image identification unit 22.

In the present embodiment, the image processing apparatus 10 is realized by, for example, a general-purpose personal computer (PC). The PC may be various types of computer such as, for example, a desktop type, a laptop type, and a tablet type. The PC includes, for example, a central processing unit (CPU), a memory, a hard disk drive (HDD), an input interface, an input device, and a display device. The HDD has a program stored thereon. The degree-of-relevance calculation unit 12, the important image extraction unit 14, the relevant image extraction unit 18, and the image identification unit 22 are realized, for example, by the CPU executing a program loaded in the memory. The input device is constituted by, for example, a mouse, a keyboard, a touch sensor, and the like. The instruction input unit 16 is realized by, for example, the input interface and the input device. The display device is constituted by, for example, a liquid crystal display, an organic EL (Electro-Luminescence) display, or the like. The display unit 20 is realized by a display device 20.

Figure 2:
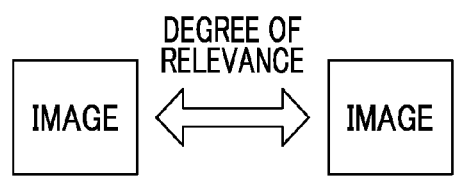
FIG. 2 is a conceptual diagram of an example illustrating a state where the degree of relevance between two images is calculated.

The degree-of-relevance calculation unit 12 calculates the degree of relevance between each of a plurality of images (between two images, respectively), as shown in FIG. 2, on the basis of items such as a person's face captured in the images, determination results of scenes and objects of the images, GPS information (location information) of the images, and the degree of similarity of the images.

Meanwhile, it is possible to use a combination of one or two or more of various items for calculating the degree of relevance between images, without being limited to the aforementioned items.

When the degree of relevance is calculated on the basis of the person's face captured in the images, the degree-of-relevance calculation unit 12 calculates the degree of relevance on the basis of items such as individual persons determined by performing a central person determination on a plurality of persons captured in the plurality of images, the number of person's faces captured in the images, and the sizes of the person's faces captured in the images.

Meanwhile, it is possible to use a combination of one or two or more of various items for calculating the degree of relevance on the basis of the person's face captured in the images, without being limited to these three items.

Here, in the central person determination, the determination of the same person is performed on a plurality of face images extracted from each of the images, and a plurality of face images are classified into image groups of a face image for each same person. Subsequently, a person corresponding to each of the image groups is specified on the basis of an image of each of registered persons who are registered in advance. One or more persons of the specified persons are determined to be main characters, and one or more persons having high relevance to the main characters among persons other than the main characters are determined to be important persons.

For example, a person having the largest number of face images detected is determined to be a main character, or a person having a large number of images captured together with the main character, among persons other than the main character, is determined to be an important person.

In addition, a distance between a face image of the main character captured in the same image and a person's face image other than main character may be calculated, and a person located at a close distance between the face images may be determined to be an important person.

An important person may be determined on the basis of one of both a difference between the photographing date of the image in which the main character is captured and the photographing date of the image in which a person other than the main character is captured, and a difference between the photographing location of the image in which the main character is captured and the photographing location of the image in which a person other than the main character is captured.

When the degree of relevance between two images is calculated on the basis of a person's face captured in the images, for example, as shown in Table 1, the degree-of-relevance calculation unit 12 calculates the degree of relevance between two images in accordance with whether persons captured in two images are the same person or not the same person, whether the numbers of faces captured in two images are the same as each other or different from each other, and whether the sizes of faces captured in two images are the same as each other or different from each other, as a result of the central person determination.

For example, when persons captured in two images are the same person, the numbers of faces captured in two images are the same as each other, and the sizes of the faces captured in two images are the same as each other, the degree of relevance is considered to be highest, and thus, as shown in Table 1, the degree-of-relevance calculation unit 12 calculates the degree of relevance of two images to be 10. The same is true of other cases.

TABLE 1

| Results of central person determination | Number of faces | Face size | Degree of relevance |
|---|---|---|---|
| Same person | Same | Same | 10 |
| | | Different | 9 |
| | Different | Same | 8 |
| | | Different | 7 |
| Not same person | Same | Same | 6 |
| | | Different | 5 |
| | Different | Same | 4 |
| | | Different | 3 |

In addition, when the degree of relevance is calculated on the basis of the determination results of image contents, the degree-of-relevance calculation unit 12 calculates the degree of relevance on the basis of the determination results of a scene of the image or the determination results of an object (photographic subject) included in the image which are based on scene recognition or object recognition.

When the degree of relevance is calculated on the basis of the determination results of a scene of the image, the degree-of-relevance calculation unit 12 calculates the degree of relevance in accordance with whether the keyword of an annotation tag is the same keyword, whether the category of an annotation tag is the same category, and others (neither the same keyword and nor the same category), on the basis of a scene of an annotation tag of an image recognized by performing an annotation analysis on each of the images.

Here, the scene of an annotation tag indicates a scene of each of the images recognized by an annotation analysis. When the scene of an image is recognized by an annotation analysis, the image is given an annotation tag corresponding to the recognized scene.

The annotation tag is classified into categories of, for example, a person, a party, a landscape, and nature, and the like, and a plurality of keywords are set in each of the categories in advance. For example, the category of a party includes an annotation tag of a keyword such as a bouquet, a cake, or a candle. The same is true of other categories.

Meanwhile, it is possible to appropriately determine what category and keyword the annotation tag is classified into.

For example, when keywords of annotation tags of two images are the same keyword, and others (not a face close-up image), the degree of relevance is considered to be high, and thus, as shown in Table 2, the degree-of-relevance calculation unit 12 calculates the degree of relevance of the two images to be 10. In a case of a face close-up image (determined by the size of the face), the face is considered to be of high priority, and thus it is not necessary to consider the scene of an annotation tag. For this reason, when the keywords of annotation tags of two images are the same keyword and a face close-up image, the degree-of-relevance calculation unit 12 calculates the degree of relevance of the two images to be 2. The same is true of other cases.

In addition, when the degree of relevance is calculated on the basis of the determination results of objects (for example, photographic subjects such as arms and legs, a pet, and Tokyo Tower) included in the images, the degree-of-relevance calculation unit 12 calculates the degree of relevance in accordance with whether the objects are the same as each other, on the basis of the objects included in the images which are recognized by performing object recognition on each of the images.

Meanwhile, since a method of determining objects included in images is publicly known, the detailed determination method herein will not be given.

TABLE 2

| | Degree of relevance | |
|---|---|---|
| Item | Face close-up image | Others |
| Same keyword | 2 | 10 |
| Same category | 2 | 8 |
| Others | 2 | 2 |

In addition, when the degree of relevance between two images is calculated on the basis of GPS information (supplementary information of images) of images, the degree-of-relevance calculation unit 12 calculates the degree of relevance on the basis of a distance between photographing places of the images.

For example, as shown in Table 3, when a distance between photographing places of two images is short, the degree of relevance is considered to be high, and thus the degree-of-relevance calculation unit 12 calculates the degree of relevance of the two images to be 10. The same is true of other cases. When one or both of the two images do not have GPS information, the degree of relevance is not able to be calculated on the basis of the GPS information, and thus the degree-of-relevance calculation unit 12 calculates the degree of relevance of the two images to be 5.

TABLE 3

| Item | Degree of relevance |
|---|---|
| Short distance | 10 |
| Middle distance | 8 |
| Long distance | 2 |
| No GPS information present in one or both of two images | 5 |

In addition, when the degree of relevance is calculated on the basis of the degree of similarity of the images, the degree-of-relevance calculation unit 12 calculates the degree of relevance on the basis of the color tones or compositions of the images. For example, as the color tones of the images become closer to each other, and the compositions thereof become more similar to each other, the degree of relevance is calculated so as to become higher.

Meanwhile, since a method of calculating the degree of similarity of images is publicly known, the detailed calculation method herein will not be given.

In addition, when the degree of relevance is calculated on the basis of two or more items of a person's face captured in the images, the determination results of scenes and objects of the images, GPS information of the images, and the degree of similarity of the images, the degree-of-relevance calculation unit 12 calculates, as the degree of relevance, a comprehensive degree of relevance which is the sum total of the products of the items and weighting coefficients for the items, with respect to the two or more items.

For example, as shown in Table 4, when the degree of relevance is calculated on the basis of three items of a person's face captured in the images, the determination result of the scenes of the images, and GPS information of the images, the degree-of-relevance calculation unit 12 calculates a comprehensive degree of relevance by degree of relevance calculated on the basis of a person's face captured in two images×the degree of relevance calculated on the basis of a weighting coefficient of 1.0+the determination results of the scenes of two images×the degree of relevance calculated on the basis of a weighting coefficient of 0.5+GPS information of two images × a weighting coefficient of 0.5.

TABLE 4

| Item | Weighting |
| --- | --- |
| Person's face (central person determination, number of faces, size of face) | 1.0 |
| Scene of annotation tag | 0.5 |
| GPS information | 0.5 |

Meanwhile, how to calculate the degree of relevance between two images, how to set a weighting coefficient of each degree of relevance when a comprehensive degree of relevance is calculated, and the like are not limited at all, and can be appropriately changed. For example, the weighting coefficient may be automatically calculated and set in accordance with information included in the images, and the weighting coefficient may be arbitrarily set in accordance with a user's taste or object.

In addition, which item of a person's face captured in the images, the determination result of scenes and objects of the images, GPS information of the images, and the degree of similarity of the images is used in the calculation of the degree of relevance may be set in advance, or may be designated by an instruction which is input through the instruction input unit 16. In the latter case, the degree-of-relevance calculation unit 12 calculates the degree of relevance on the basis of at least one item of a person's face captured in the images, determination results of scenes and objects in the images, GPS information of the images, and the degree of similarity of the images, which is designated by the instruction which is input through the instruction input unit 16.

The important image extraction unit 14 extracts images captured over a certain period of time including a reference date for determining the degree of importance of the image, and images captured over a certain period of time including a relevant date relevant to the reference date, as important images, from the above-mentioned plurality of images.

Here, the reference date is not limited at all, but examples of the reference date to be used include a date on which the image processing apparatus 10 is started up (powered-on), a photographing date of one selected image selected by a user from a plurality of images, a photographing date of one relevant image selected by a user from a certain number of relevant images displayed as a list, and the like.

When the image processing apparatus 10 is started up, and then the selected image and a certain number of relevant images are initially displayed as a list, the setting of the reference date to a date on which the image processing apparatus 10 is started up can cause a list of different images to be displayed each time whenever the image processing apparatus 10 is started up. In addition, when the image processing apparatus 10 is started up, and then the selected image and a certain number of relevant images are displayed as a list for a second and subsequent times, the setting of the reference date to the photographing date of one relevant image selected can cause a list of different images to be displayed each time whenever one relevant image is selected.

The relevant date relevant to the reference date is not limited at all insofar as the relevant date is a date (date of which only a portion is the same as the reference date) which is somewhat the same as the reference date.

When the photographing period of time over which a plurality of images have been shot is longer than a year, the important image extraction unit 14 extracts, as the important images, images captured over a certain period of time including the same day of the same month in one or more years different from that of the reference date, for example, as the relevant date. In this case, images captured in the same season in one or more years different from the reference date, for example, as the relevant date may be extracted as important images.

On the other hand, when the photographing period of time over which a plurality of images have been shot is within a year, the important image extraction unit 14 extracts, as the important images, images captured over a certain period of time including the same day in one or more months different from the reference date, for example, as the relevant date. In this case, images captured on the same day of the week as the reference date, for example, as the relevant date may be extracted as important images.

In addition, a certain period of time including the reference date indicates not only the reference date, but also, for example, a certain period of time after the reference date from the reference date, a certain period of time before the reference date from the reference date, and a certain period of time before and after the reference date inclusive of the reference date. A certain period of time may be, for example, only the reference date, and several days including the reference date, or may be set to a period of an event by detecting the event when the reference date is a day of several days of events as in a journey or the like. The same is true of a certain period of time including the relevant date.

In addition, the important image extraction unit 14 makes a determination so that the degree of importance of the images captured over a certain period of time including the reference date is highest, and that the degree of importance of the images captured over a certain period of time including the relevant date gradually becomes lower as the relevant date becomes farther from the reference date.

Figure 3:
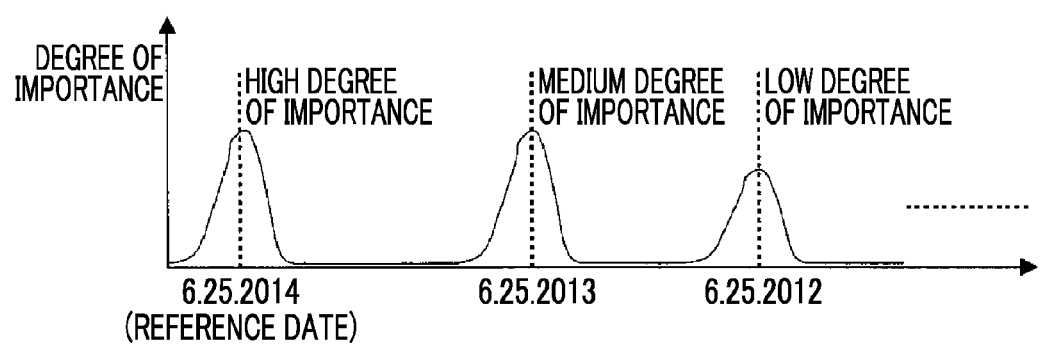
FIG. 3 is a conceptual diagram of an example illustrating a state where the degree of importance of images captured over a certain period of time including a relevant date is determined.

For example, as shown in FIG. 3, when the reference date is Jun. 25, 2014, the important image extraction unit 14 can determine that images captured over a certain period of time including Jun. 25, 2014, images captured over a certain period of time including Jun. 25, 2013, just a year ago, images captured over a certain period of time including Jun. 25, 2012, two years ago, and the like are important.

In addition, a determination can be made so that the degree of importance of the images captured over a certain period of time including Jun. 25, 2014 which is the reference date is highest, and that the degree of importance gradually becomes lower in order of the images captured over a certain period of time including Jun. 25, 2013, just a year ago, the images captured over a certain period of time including Jun. 25, 2012, two years ago, and the like.

The instruction input unit 16 receives various instructions which are input by a user.

In the case of the present embodiment, the instruction input unit 16 receives an instruction for specifying a selected image selected by a user from a plurality of images, an instruction for specifying one relevant image selected by a user from a certain number of relevant images displayed as a list, an instruction for specifying items, used in the degree-of-relevance calculation unit 12, such as a person's face captured in the images, the determination results of scenes and objects in the images, GPS information of the images, or the degree of similarity of the images, and the like.

The relevant image extraction unit 18 extracts a certain number of images, as the relevant images, from the important images in which the degree of relevance for the selected image selected from the above-mentioned plurality of images by instructions which are input through the instruction input unit 16 is equal to or greater than a threshold.

Here, it is preferable that the relevant image extraction unit 18 extracts a certain number images corresponding to a ratio between the degrees of importance of the images captured over a certain period of time including the reference date and the images captured over a certain period of time including the relevant date, from the images captured over a certain period of time including the reference date and the images captured over a certain period of time including the relevant date. Thereby, as the degree of importance becomes higher, the number of images extracted can be made larger.

For example, in the case of the example shown in FIG. 3, the relevant image extraction unit 18 extracts the largest number of images from the images captured over a certain period of time including Jun. 25, 2014 which is the reference date. The number of images extracted is gradually reduced in order of the images captured over a certain period of time including Jun. 25, 2013, just a year ago, the images captured over a certain period of time including Jun. 25, 2012, two years ago, and the like.

In addition, it is preferable that the relevant image extraction unit 18 extracts images uniformly from the important images in which the degree of relevance for the selected image is equal to or greater than a threshold. Thereby, the relevant images relevant to the selected image can be extracted uniformly and thoroughly.

Meanwhile, the threshold is not limited at all, and may be set in advance, or may be set by instructions which are input through the instruction input unit 16. For example, the threshold may be automatically calculated and set on the basis of a plurality of images, and the threshold may be arbitrarily set in accordance with a user's taste or object.

The display unit 20 displays the selected image and a certain number of relevant images as a list.

Figure 6:
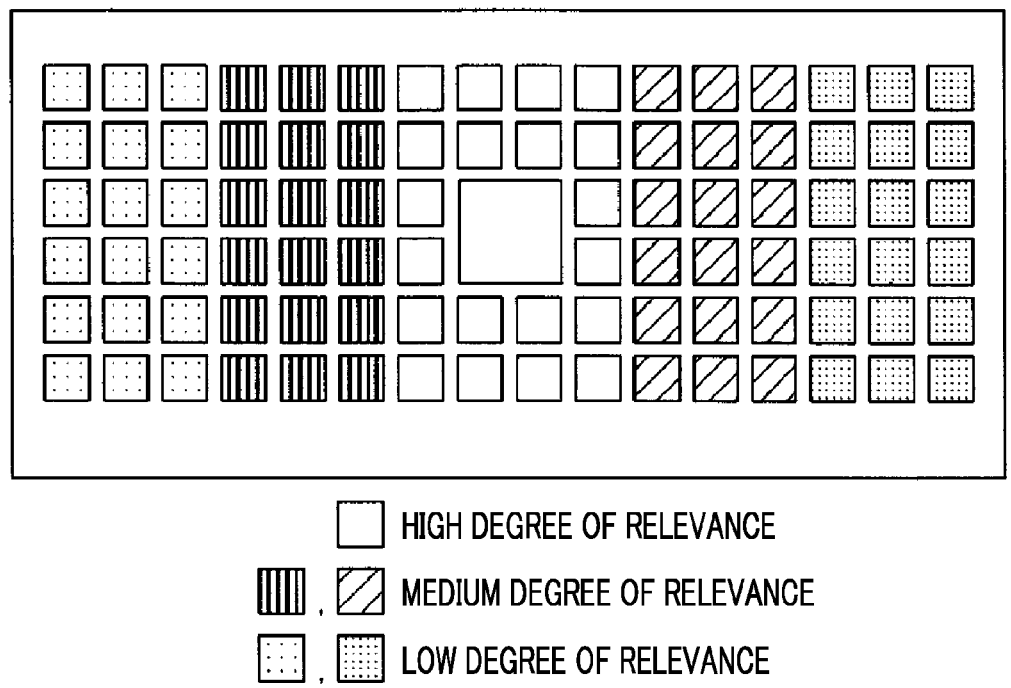
FIG. 6 is a conceptual diagram of an example illustrating a display screen in which a certain number of relevant images are displayed as a list side by side in order of a comprehensive degree of relevance.

Here, the display unit 20 can display a certain number of relevant images as a list side by side in order of photographing date, for example, as shown in FIG. 4, display the images as a list by classification into relevant images having the same feature as shown in FIG. 5, or display the images as a list side by side in order of a comprehensive degree of relevance as shown in FIG. 6. Meanwhile, a method of displaying a list of a certain number of relevant images is not limited to the above example, and a list display may be performed in any way.

In the example of FIG. 4, a selected image is displayed in the central portion of a display screen at a double size, and a certain number of relevant images are displayed as a list side by side in order of photographing date in the vicinity of the selected image.

In the example of FIG. 5, similarly, a selected image is displayed in the central portion of a display screen at a double size. In addition, a certain number of relevant images are classified into images in which the same person's face as that of the selected image is captured, images of the same scene as that of the selected image, images of the same photographing date as that of the selected image, and images of the same color tone as that of the selected image, and are displayed as a list in regions on the upper left, the upper right, the lower left, and, the lower right of the display screen.

In the example of FIG. 6, similarly, a selected image is displayed in the central portion of a display screen at a double size. In addition, a certain number of relevant images are classified into relevant images of first to fifth groups in descending order of a comprehensive degree of relevance, relevant images of the first group are displayed as a list in the vicinity of the selected image located in the central portion, relevant image of the second and third groups are displayed as a list on both side of the relevant images of the first group, and relevant images of the fourth and fifth groups are displayed as a list on both sides of the relevant images of the second and third groups, respectively.

The image identification unit 22 identifiably displays relevant images capable of extracting a certain number of relevant images, when the certain number of relevant images can be extracted from the plurality of images, using the relevant image as the selected image, with respect to the certain number of relevant images displayed as a list.

For example, when at least one item of the presence of GPS information of the relevant images capable of identifying a person's face captured in the relevant images and determining scenes and objects of the relevant images and the presence of an image in which the degree of similarity to the relevant images is equal to or greater than a threshold is satisfied, the image identification unit 22 identifiably displays relevant images satisfying the at least one item.

Here, when one relevant image is selected by instructions which are input through the instruction input unit 16, from the certain number of relevant images displayed as a list, an image difficult to extract a certain number of relevant images, using the one relevant image which is selected as the selected image, may be included in the certain number of relevant images displayed as a list. For example, even in an image in which a person's face is captured, the accuracy of face detection and face recognition is not perfect, and thus a person may not be able to be identified.

For this reason, even when a user considers to desire to select an image in which a person's face is captured with a large size, and extract and display a person image relevant to the person, there is a possibility of a relevant image unlike a user's expectation being extracted and displayed.

For example, as shown in FIG. 4, the image identification unit 22 can display relevant images capable of extracting the certain number of relevant images, using the relevant image as the selected image, that is, relevant images satisfying the aforementioned at least one item so as to be surrounded by a frame, or display the relevant images in a state where the size of the relevant image satisfying at least one item is made larger than the size of the relevant image which does not satisfy at least one item. Meanwhile, an identification display method is not limited to the above two examples, and an identification display may be performed in any way.

For example, a relevant image capable of correctly identifying a person's face captured is displayed so as to be surrounded by a red frame, a relevant image capable of correctly determining a scene is displayed so as to be surrounded by a yellow frame, and a relevant image having GPS information is displayed so as to be surrounded by a green frame. Thereby, before a user selects one relevant image from a certain number of relevant images displayed as a list, the user can recognize relevant images capable of extracting the certain number of relevant images, using the one relevant image as the selected image, and thus it is possible to assume in advance what certain number of relevant images are extracted.

Next, operations of the image processing apparatus 10 will be described.

After the image processing apparatus 10 is started up, first, the degree-of-relevance calculation unit 12 calculates the degree of relevance between each of a plurality of images on the basis of, for example, each item of a person's face captured in the images, determination results of scenes and objects in the images, GPS information of the images, and, the degree of similarity of the images.

In addition, the reference date is set to, for example, a date on which the image processing apparatus 10 is started up, by the important image extraction unit 14. Images captured over a certain period of time including the reference date and images captured over a certain period of time including the relevant date relevant to the reference date are extracted, as important images, from the plurality of images.

Subsequently, an instruction for selecting one image as a selected image from the plurality of images is input by a user through the instruction input unit 16.

In response, the relevant image extraction unit 18 extracts a certain number of images, as the relevant images, from the important images in which the degree of relevance for the selected image selected by the instruction which is input through the instruction input unit 16 is equal to or greater than a threshold.

As shown in FIG. 4, the display unit 20 displays the selected image and the certain number of relevant images as a list. In the example of FIG. 4, the selected image is displayed in the central portion at a double size, and the certain number of relevant images is displayed side by side in order of photographing date in the vicinity of the selected image.

In this manner, a user selects one image as the selected image from the plurality of images, and thus a certain number of relevant images relevant to the selected image are automatically extracted from the plurality of images and are displayed as a list on the display unit 20. A user views a certain number of relevant images relevant to the selected image which is automatically displayed, and thus can refresh a forgotten memory even for the user himself (or herself) together with surprise or nostalgia.

Subsequently, an instruction for selecting one relevant image as the selected image (next selected image) from the certain number of relevant images displayed as a list is input by a user through the instruction input unit 16.

In response, the reference date is set to, for example, the photographing date of one relevant image selected by the instruction which is input through the instruction input unit 16, by the important image extraction unit 14. Similarly, important images are extracted using the photographing date of one relevant image which is selected, as the reference date.

Subsequently, the relevant image extraction unit 18 extracts a certain number of relevant images, similarly using one relevant image which is selected, as the selected image.

The display unit 20 displays, as a list, one relevant image which is selected, and a certain number of relevant images extracted using one relevant image which is selected, as the selected image. Similarly, one relevant image which is selected is displayed in the central portion at a double size, and a certain number of relevant images extracted are displayed in order of photographing date in the vicinity of one relevant image which is selected. That is, a certain number of relevant images displayed as a list are changed in accordance with one relevant image which is selected.

Figure 7:
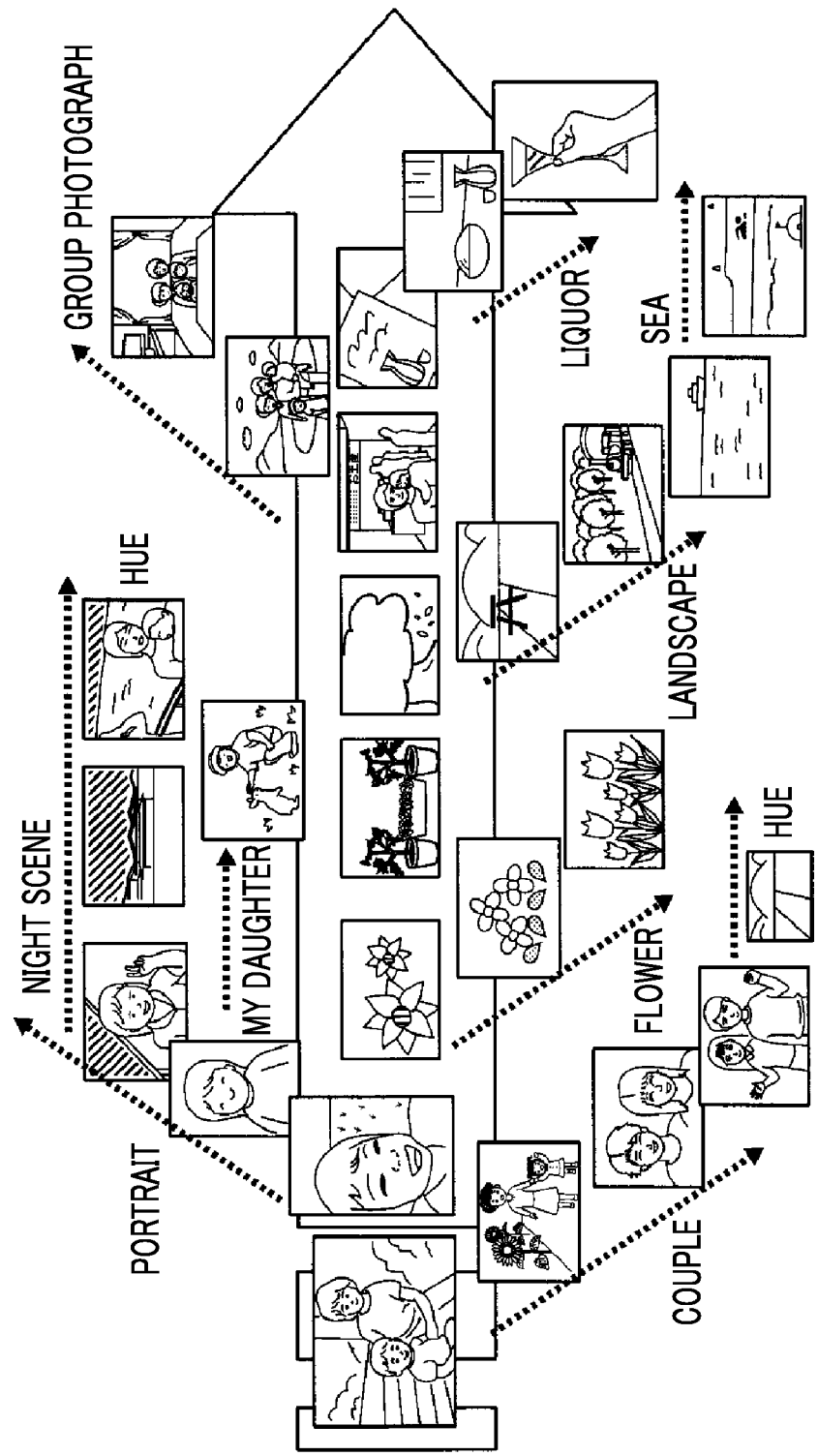
FIG. 7 is a conceptual diagram of an example illustrating a state where images which are displayed as a list are changed one after another from various viewpoints.

Thereafter, similarly, a user selects one relevant image as the selected image from a certain number of relevant images, displayed as a list, which are extracted using one relevant image selected, as the selected image, and thus a certain number of relevant images displayed as a list are sequentially changed. As shown in FIG. 7, a user can change images to be displayed one after another from various viewpoints, and can continue to enjoy viewing a certain number of relevant images relevant to the selected image, or enjoy printing a display screen.

Figure 8:
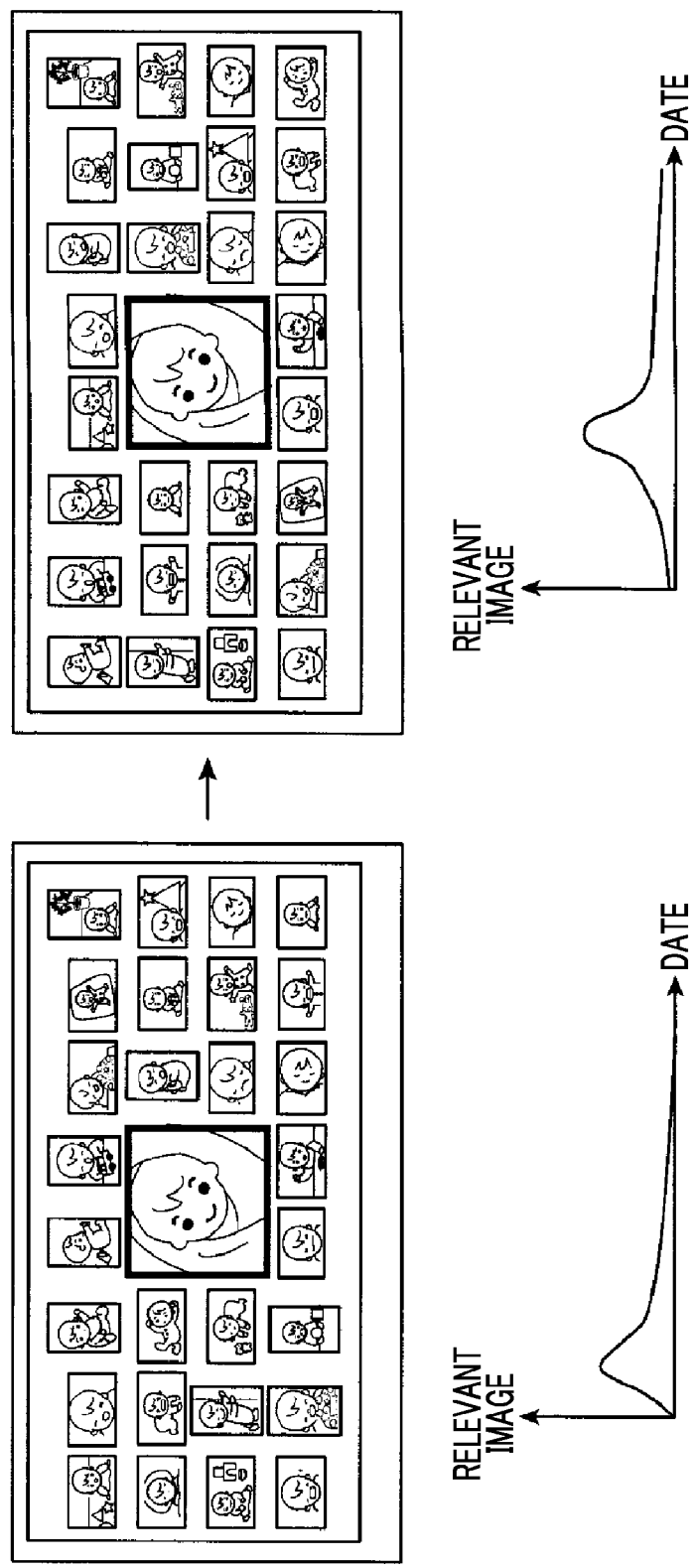
FIG. 8 is a conceptual diagram of an example illustrating a state where a reference date is changed whenever a certain period of time has elapsed.

Subsequently, when the instruction for selecting one relevant image as the selected image from a certain number of relevant images displayed as a list is not input by a user, the reference date is changed by the important image extraction unit 14 whenever a certain period of time has elapsed. In the case of the present embodiment, as shown in FIG. 8, the reference date is changed from the photographing date of one relevant image (selected image) selected to another date and time. The important images are extracted on the basis of the changed reference date.

Operations of the relevant image extraction unit 18 and the display unit 20 subsequent to this are the same as those described above.

That is, a user does not select one relevant image as the selected image from a certain number of relevant images displayed as a list, but a certain number of relevant images displayed as a list are automatically sequentially changed whenever a certain period of time has elapsed. A user can continue to enjoy viewing a certain number of relevant images relevant to the selected image which is sequentially changed whenever a certain period of time has elapsed.

Figure 9:
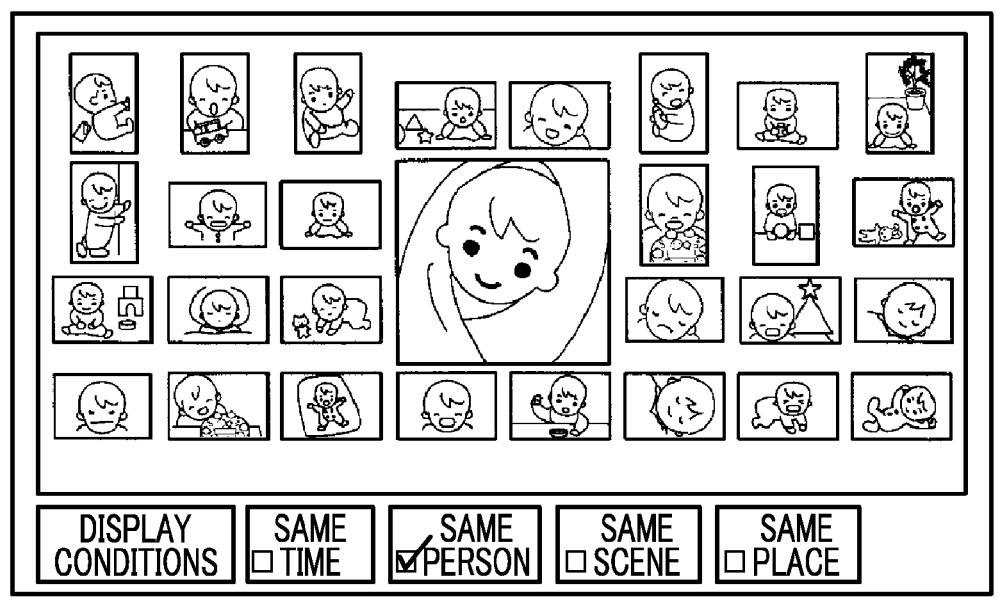
FIG. 9 is a conceptual diagram of an example illustrating a display screen for changing display conditions of a certain number of relevant images.

In addition, as shown in FIG. 9, an instruction for selecting a button of at least one item from the same time, the same person, the same scene, and the same place, as display conditions is input by a user through the instruction input unit 16.

For example, when an instruction for selecting only a button of the same person is input, the degree of relevance is calculated by the degree-of-relevance calculation unit 12 on the basis of only a person's face captured in the images. Operations of the important image extraction unit 14, the relevant image extraction unit 18 and the display unit 20 subsequent to this are the same as those described above. As a result, a certain number of relevant images in which the same person as a person captured in the selected image is captured are displayed on the display unit 20.

Similarly, when an instruction for selecting only a button of the same scene is input, the degree of relevance is calculated on the basis of only scenes of the images, and a certain number of relevant images in which the same scene as that of the selected image is captured are displayed on the display unit 20.

In addition, when an instruction for selecting only a button of the same place is input, the degree of relevance is calculated on the basis of only GPS information of the images, and a certain number of relevant images in which the same position as that of the selected image is captured are displayed on the display unit 20.

In addition, when an instruction for selecting only a button of the same time is input, images captured on the same date as the photographing date of the selected image are extracted as important images by the important image extraction unit 14, and a certain number of relevant images on the same photographing date as the that of the selected image are displayed on the display unit 20.

In addition, when an instruction for selecting buttons of two or more items from the same time, the same person, the same scene, and the same place is input, a certain number of relevant images corresponding to display conditions are displayed on the display unit 20.

For example, when an instruction for selecting buttons of the same time and the same person is input, a certain number of relevant images in which the date of the selected image and the photographing date are the same as each other, and the same person as a person captured in the selected image is captured are displayed on the display unit 20. The same is true of a combination of other display conditions.

In this manner, a user changes the display conditions, thereby allowing a certain number of relevant images corresponding to the display conditions to be displayed.

In the apparatus of the present invention, each component included in the apparatus may be constituted by dedicated hardware, and each component may be constituted by a programmed computer.

The method of the present invention can be implemented by, for example, a program for causing a computer to execute each step. In addition, it is also possible to provide a computer readable recording medium having the program recorded thereon.

The present invention is basically as described above.

As stated above, the present invention has been described in detail, but the present invention is not limited to the aforementioned embodiment, and various modifications and changes may be, of course, made without departing from the spirit and scope of the present invention.

What is claimed is:

1. An image processing apparatus comprising:
   an input device; and
   a processor configured to
      calculate a degree of relevance between a plurality of images based upon at least one item selected from a group consisting of a person's face captured in the images, determination results of scenes and objects in the images, GPS information of the images, and a degree of similarity of the images,
      extract images captured over a certain period of time including a reference date for determining a degree of importance of the image, and images captured over a certain period of time including a relevant date relevant to the reference date, as important images, from the plurality of images,
      receive various instructions input from a user through the input devices and
      extract a certain number of images, as relevant images, from the important images of which the degree of relevance to a selected image selected from the plurality of images by the instruction input through the input device is equal to or greater than a threshold.

2. The image processing apparatus according to claim 1, wherein in a case where the degree of relevance is calculated based upon the person's face captured in the images, the processor calculates the degree of relevance based upon at least one feature selected from a group consisting of individual persons determined by a central person determination for a plurality of persons captured in the plurality of images, the number of person's faces captured in the images, and sizes of the person's faces captured in the images.

3. The image processing apparatus according to claim 1, wherein in a case where the degree of relevance is calculated based upon two or more items selected from the group consisting of the person's face captured in the images, the determination results of scenes and objects in the images, the GPS information of the images, and the degree of similarity of the images, the processor calculates, as the degree of relevance, a comprehensive degree of relevance which is a sum total of products of the items and weighting coefficients for the items, with respect to the two or more items.

4. The image processing apparatus according to claim 3, further comprising a display unit configured to display the list of the selected image and the certain number of relevant images,
   wherein the display unit displays the list of certain number of relevant images in such a manner that the relevant images are arranged side by side in order of the comprehensive degree of relevance.

5. The image processing apparatus according to claim 1, wherein in a case where a photographing period of time over which the plurality of images have been taken is longer than a year, the processor extracts, as the important images, images captured over a certain period of time including the same day of the same month as the reference date of one or more other years than the year to which the reference date belong.

6. The image processing apparatus according to claim 5, wherein the processor determines the degree of importance of the important images so that the degree of importance of the images captured over a certain period of time including the reference date is highest, and that the degree of importance of the images captured over a certain period of time including the relevant date gradually becomes lower as the relevant date becomes farther from the reference date.

7. The image processing apparatus according to claim 6, wherein the processor extracts a certain number of images corresponding to a ratio between the degrees of importance of the images captured over a certain period of time including the reference date and the images captured over a certain period of time including the relevant date, from the images captured over a certain period of time including the reference date and the images captured over a certain period of time including the relevant date.

8. The image processing apparatus according to claim 7, wherein the processor extracts images evenly from the important images of which the degree of relevance to the selected image is equal to or greater than a threshold.

9. The image processing apparatus according to claim 1, wherein in a case where a photographing period of time over which the plurality of images have been taken is longer than a year, the processor extracts, as the important images, images captured in the same season as the reference date of one or more other years than the year to which the reference date belong, as the relevant date.

10. The image processing apparatus according to claim 1, wherein in a case where a photographing period of time over which the plurality of images have been taken is within a year, the processor extracts, as the important images, images captured over a certain period of time including the same day as the reference date of one or more other months than the month to which the reference date belong, as the relevant date.

11. The image processing apparatus according to claim 1, wherein in a case where a photographing period of time over which the plurality of images have been taken is within a year, the processor extracts, as the important images, images captured on the same day of the week as the reference date in one or more other weeks than the week to which the reference date belong, as the relevant date.

12. The image processing apparatus according to claim 1, further comprising a display unit configured to display a list of the selected image and the certain number of relevant images.

13. The image processing apparatus according to claim 12, wherein in a case where the list of the selected image and the certain number of relevant images are initially displayed after a startup of the image processing apparatus, the reference date is a date on which the image processing apparatus is started up.

14. The image processing apparatus according to claim 12, wherein in a case where an instruction for selecting one relevant image from the certain number of relevant images in the displayed list is input through the instruction input device,
the processor extracts the important images, using a photographing date of the one relevant image which is selected as the reference date,
the processor extracts the certain number of relevant images, using the one relevant image which is selected as the selected image, and
the display unit displays a list of the one relevant image which is selected and the certain number of relevant images extracted using the one relevant image which is selected as the selected image.

15. The image processing apparatus according to claim 12, wherein the processor is further configured to identifiably display relevant images capable of extracting the certain number of relevant images, in a case where the certain number of relevant images is capable of being extracted from the plurality of images, using the relevant image as the selected image, with respect to the certain number of relevant images in the displayed list.

16. The image processing apparatus according to claim 15, wherein the processor displays relevant images which satisfy at least one condition selected among a person's face captured in the relevant images being identifiable, scenes and objects of the relevant images being identifiable, GPS information of the relevant images being present, and an image of which the degree of similarity to the relevant images is equal to or greater than a threshold being included in the plurality of images.

17. The image processing apparatus according to claim 16, wherein the processor displays the relevant images satisfying the at least one item so as to be surrounded by a frame.

18. The image processing apparatus according to claim 16, wherein the processor performs a display in a state where a size of the relevant image satisfying the at least one item is made larger than a size of the relevant image which does not satisfy the at least one item.

19. The image processing apparatus according to claim 12, wherein the display unit displays the list of the certain number of relevant images by classification into relevant images having the same feature.

20. The image processing apparatus according to claim 1, wherein the processor changes the reference date whenever a certain period of time has elapsed, and extracts the important images based upon the changed reference date.

21. The image processing apparatus according to claim 1, wherein the processor calculates the degree of relevance based upon at least one item designated by the instruction which is input through the instruction input device, among the person's face captured in the images, the determination results of scenes and objects in the images, the GPS information of the images, and the degree of similarity of the images.

22. An image processing method comprising:
a step of causing a degree-of-relevance calculation unit to calculate a degree of relevance between a plurality of images based upon at least one item selected from a group consisting of a person's face captured in the images, determination results of scenes and objects in the images, GPS information of the images, and a degree of similarity of the images;
a step of causing an important image extraction unit to extract images captured over a certain period of time including a reference date for determining a degree of importance of the image, and images captured over a certain period of time including a relevant date relevant to the reference date, as important images, from the plurality of images; and
a step of causing a relevant image extraction unit to extract a certain number of images, as relevant images, from the important images of which the degree of relevance to a selected image selected from the plurality of images by an instruction which is input through an instruction input unit is equal to or greater than a threshold.

23. A non-transitory computer readable recording medium on which recorded is a program for causing a computer to execute each step of the image processing method according to claim 22.

* * * * *